(12) United States Patent
Khor et al.

(10) Patent No.: US 7,397,623 B2
(45) Date of Patent: Jul. 8, 2008

(54) USING A MECHANICAL STOP FOR DETERMINING AN OPERATING PARAMETER OF A DATA HANDLING DEVICE

(75) Inventors: EikFun Khor, Malaysia (MY); WingKong Chiang, Singapore (SG); KianKeong Ooi, Singapore (SG); June Christian Ang, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 498 days.

(21) Appl. No.: 10/685,150

(22) Filed: Oct. 14, 2003

(65) Prior Publication Data

US 2005/0078402 A1    Apr. 14, 2005

(51) Int. Cl.
G11B 21/02 (2006.01)
G11B 27/36 (2006.01)
G11B 5/02 (2006.01)

(52) U.S. Cl. ............................ 360/75; 360/55; 360/31

(58) Field of Classification Search .................. 360/75, 360/31, 77.02, 77.07, 78.04
See application file for complete search history.

(56) References Cited

U.S. PATENT DOCUMENTS

| | | | |
|---|---|---|---|
| 5,999,375 A | 12/1999 | Forbord et al. | |
| 6,040,955 A | 3/2000 | Brown et al. | |
| 6,130,796 A | 10/2000 | Wiselogel | |
| 6,239,937 B1 | 5/2001 | Troemel | |
| 6,411,459 B1 | 6/2002 | Belser et al. | |
| 6,466,385 B1 | 10/2002 | Umeda et al. | |
| 6,483,658 B1 | 11/2002 | Nguyen | |
| 6,493,176 B1 | 12/2002 | Deng et al. | |
| 6,496,322 B1* | 12/2002 | Hasegawa et al. | 360/77.08 |
| 6,515,382 B1 | 2/2003 | Ullakko | |
| 6,567,232 B1 | 5/2003 | Klaassen | |
| 6,590,731 B1 | 7/2003 | Pan et al. | |
| 6,603,627 B1* | 8/2003 | Chainer et al. | 360/75 |
| 6,614,614 B1* | 9/2003 | Murayama et al. | 360/77.02 |
| 6,715,032 B1* | 3/2004 | Lee | 711/112 |
| 6,819,519 B2* | 11/2004 | Takaishi et al. | 360/77.02 |
| 2005/0041321 A1* | 2/2005 | Settje et al. | 360/77.02 |

* cited by examiner

*Primary Examiner*—Andrew L. Sniezek
(74) *Attorney, Agent, or Firm*—Westman, Champlin & Kelly, P.A.

(57) ABSTRACT

Several readings of an actuator's location are taken with a given head while urging the actuator against a mechanical stop, which acts as a guide. These readings are useful, for example, for estimating certain offsets or for determining a nominal track range for a data surface.

17 Claims, 5 Drawing Sheets

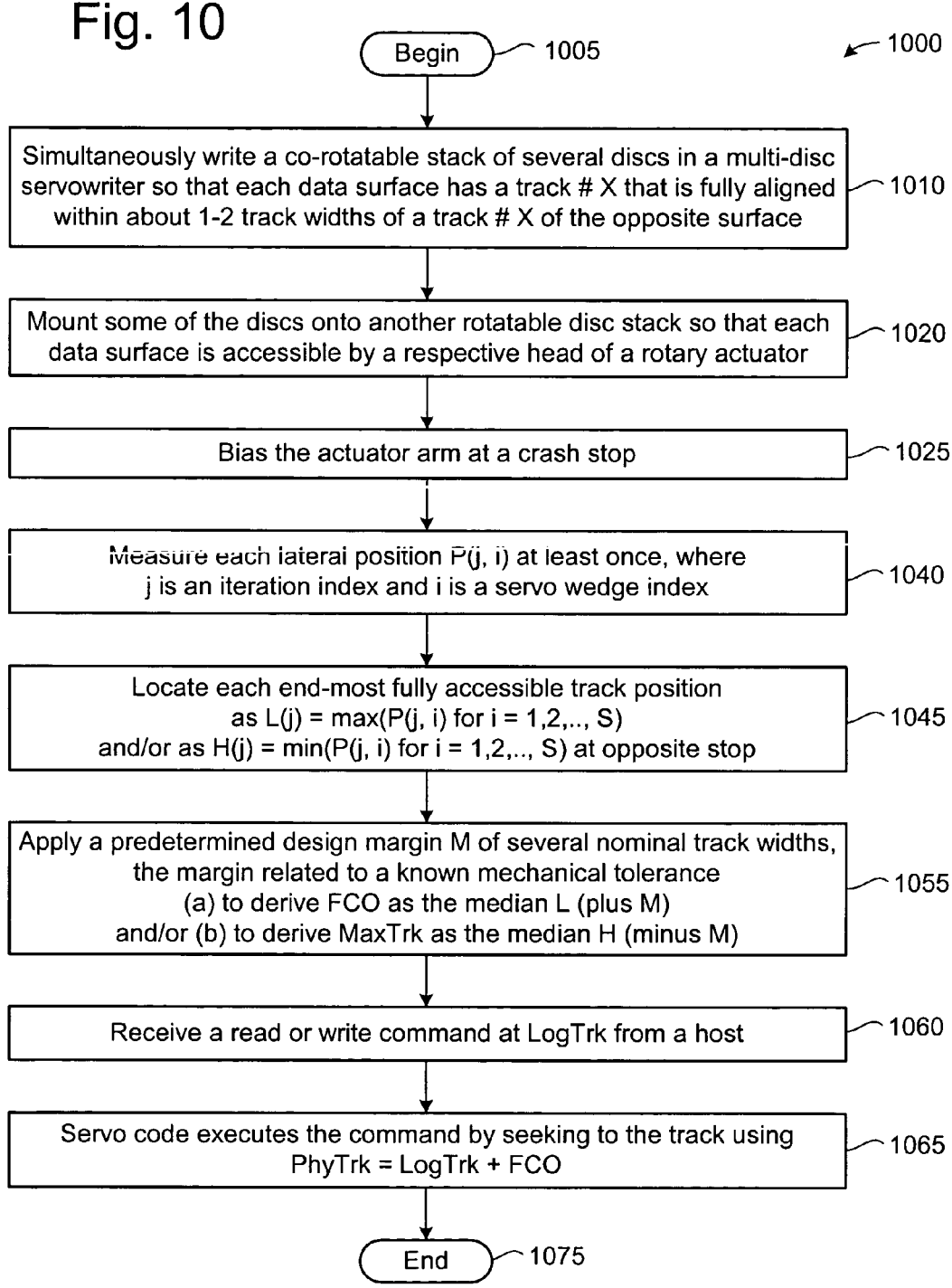

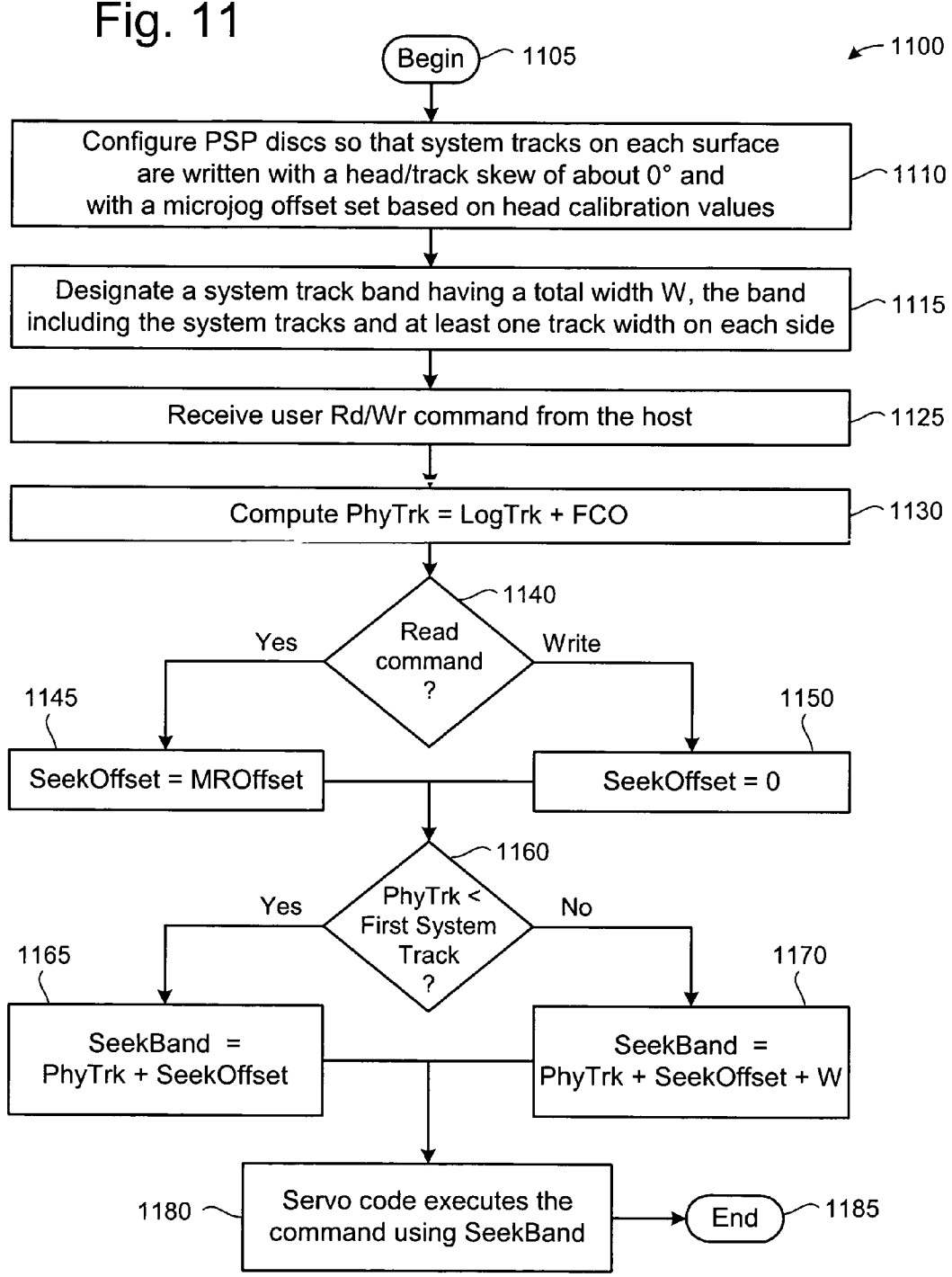

USING A MECHANICAL STOP FOR DETERMINING AN OPERATING PARAMETER OF A DATA HANDLING DEVICE

FIELD OF THE INVENTION

This application relates generally to measurements and more particularly to those relating to determining a location.

BACKGROUND OF THE INVENTION

Computer and other data handling systems have a variety of types of data storage. One common place for storing very large amounts of data is in an ordinary disc drive. The most basic parts of a disc drive are the housing, the rotatable data storage disc(s), the actuator assembly that moves a head to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the head over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the heads) can be positioned over any radial location along the rotating disc surface.

The head is typically placed on a small ceramic block, also referred to as a slider, that is aerodynamically designed so that it flies over the disc. The slider is passed over the disc adjacent a data surface. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Heads, in the form of read/write heads attached to the sliders, located on both sides of the storage disc, read and write information on the storage discs when the heads are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. To write to or read from different tracks, the read/write head is moved radially across the tracks to a selected target track. The data is often divided between several different tracks. While most storage discs utilize multiple concentric circular tracks, other discs have tracks forming a continuous spiral on each data surface.

During manufacturing, servo information is encoded on the disc and subsequently used to accurately locate the head. The written servo information is used subsequently to locate the actuator assembly/head head at the required position on the disc surface and hold it very accurately in position during a read or write operation. The servo information is written or encoded onto the disc with a machine commonly referred to as a servo track writer (hereinafter STW). At the time the servo information is written, the disc drive is typically at the "head disc assembly" (hereinafter HDA) stage. The HDA includes most of the mechanical drive components but does not typically include all the drive electronics. During the track writing process, the STW precisely locates the head heads relative to the disc surface and writes the servo information thereon.

As demand for higher capacity drives grows, manufacturers are constantly seeking to increase drive capacity while keeping costs and cycle times low. Today, ordinary STW technology is often too limited in production volume to meet increasing market demand and stringent cost reduction targets. To address this issue, Prewritten-Servo-Patterns (PSP) are presently a promising technology. For example, in the field of MDW (Multi-Disc Writer) technology, a special disc-writing machine is applied to write servo tracks on multiple discs at a time, with the multiple-head support of the MDW machine. The written discs are then built into the drives. The main advantage of PSP technology is its ability to reduce valuable factory clean room space and cycle time through the servo track writing on several discs on a single machine, simultaneously. As such, the cost savings are estimated to be significant over ordinary non-PSP. Since the PSP machines are built with high precision specifications, the track squeeze severity on high TPI servo system can be reduced. For these reasons, PSP technology has been found to be an encouraging alternative solution over ordinary STW technology.

While promising more favorable combinations of throughput and precision, technologies like PSP have caused a host of other issues that component manufacturers have yet to address. Such devices often have novel and unaccounted-for design features such as centering offsets and/or poorly-selected region boundaries. It would be advantageous, moreover, to perform certain parametric monitorings, screens, calibrations, and similar measurements relating to observed design features on a large-scale sample of devices. Accordingly, what is needed is an apparatus and method for performing such measurements accurately and cost-effectively.

SUMMARY OF THE INVENTION

Methods and devices of the present invention address this problem by using several readings of an actuator's location taken with a given head while urging the actuator against a stop. The readings can be used in a variety of ways. In one embodiment, a method for determining a maximum-numbered physical track that is accessible within a selected head's nominal track range, the urging step includes a step of reading from a highest-numbered track that the stop permits the head to access fully (i.e. along its entire length).

A second embodiment includes a step of taking at least 16 such readings while urging the actuator against the stop. If the readings are adequately distributed longitudinally (preferably uniformly, or at least spanning each 85% of a cycle), this may allow a most extreme one of the readings to be an adequately representative value for purposes of designating limits of a nominal range. This is computationally advantageous over an interpolated value derived from a best fit curve, or some other complex combination of them.

In a third embodiment, a co-rotatable stack of several discs are simultaneously written in a multi-disc writer. Each disc thus has a Prewritten Servo Pattern (PSP) of circular tracks as it is installed onto a spindle assembly and onto a disc drive baseplate to which the stop is affixed. Then the readings are taken with the actuator against the stop and used to estimate an offset between a shared center of the several tracks and a center of rotation of the data surface containing the several tracks.

In a fourth embodiment, a system track band is designated that includes a block of several annular system tracks placed where a head/track skew is about 0°. The system track band optionally includes a few guardband tracks on each side of the block. Such an embodiment is described below, together with a scheme for implementing system tracks transparent to the normal R/W code when accessing user tracks.

In a fifth embodiment, the method further includes a step of reading from a lowest-numbered track that the stop permits the head to access. A guardband is then designated based on known manufacturing tolerances, being adjacent to one side of the track range for the surface. The guardband, it should be noted, can be defined by specifying a track range limit such as by selecting FCO or MaxTrk.

In a sixth embodiment, a first data surface is positioned adjacent a first head mounted onto an actuator. The track range for the first surface is defined partly based on several lateral positions sensed while urging an arm of the actuator laterally against a stop. The track range(s) for one or more other surface(s) partly based on the several lateral positions sensed by the first head.

A seventh embodiment of the present invention is a device containing a multitude of data storage tracks. The device includes an actuator, a stop, a disc stack, and a controller. The actuator supports a head that has a range of motion. The stop defines a limit on the head's range of motion such that several of the tracks are each only partly accessible within the head's range of motion. The disc stack includes a plurality of discs written ex situ, each of the discs including a data surface that contains some of the several partly-accessible tracks. The controller is configured to use the stop to designate a guardband that includes the several partly-accessible tracks and also several adjacent, fully-accessible tracks. The controller is also configured to execute servo code that prevents any host command from accessing any tracks within the designated guardband.

Examples of the above-mentioned embodiment are shown and described in detail below. Additional features and benefits will become apparent upon reviewing the following figures and their accompanying description.

BRIEF DESCRIPTION OF THE DRAWINGS

FIG. 10 shows a flowchart of another method of the present invention.

FIG. 11 shows a flowchart of yet another method of the present invention.

DETAILED DESCRIPTION

Figure 1:
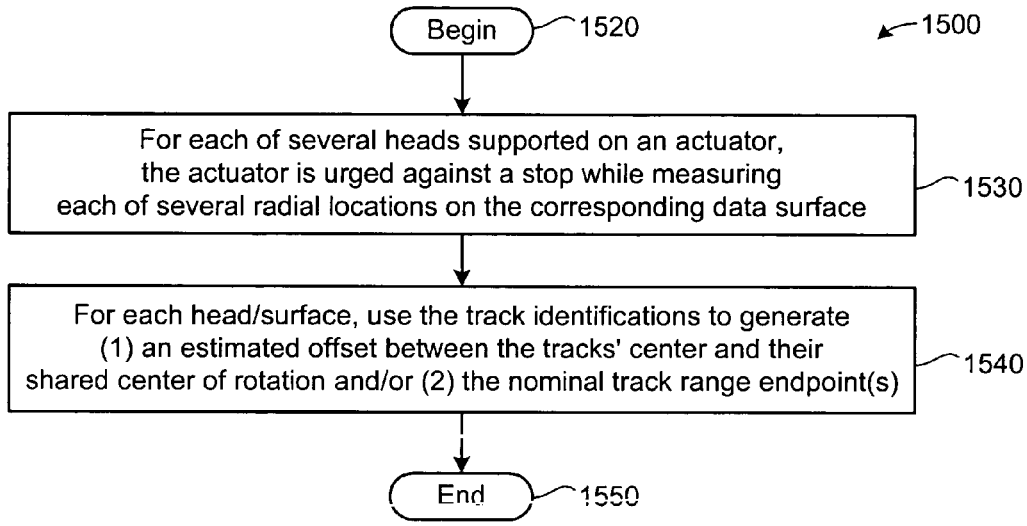
FIG. 1 shows a method of the present invention.

Although the examples below show more than enough detail to allow those skilled in the art to practice the present invention, subject matter regarded as the invention is broader than any single example below. The scope of the present invention is distinctly defined, however, in the claims at the end of this document.

To avoid needless distractions from the essence of the present invention, like-numbered reference numerals appearing in a later figure generally refer to the same elements as those in an earlier figure. Also, numerous aspects of basic engineering and of positioning technologies that are not a part of the present invention (or are well known in the art) are omitted for brevity. For example, this document does not articulate detailed and diverse methods for writing a servo sector. Neither does it include implementation decisions such as what kind of error correction codes to use or what the bit density will be on each track. Specific techniques for constructing disc stacks are likewise omitted, typically being a matter of design choice to those of ordinary skill in that field of technology.

Definitions and clarifications of certain terms are provided in conjunction with the descriptions below, all consistent with common usage in the art but some described with greater specificity. A "longitudinal" direction is aligned with a sensor's nominal direction of motion in a given (stationary or moving) frame of reference. For example, a transducer following a track is moving longitudinally, whereas a transducer moves "laterally" when seeking. A "lateral" direction is one that forms an angle of more than 45 degrees with the longitudinal direction, and typically more than 70 degrees.

Two fields are written "adjacent" to one another if there is a nominally inadequate space between them for writing additional fields. An ordinary servo sector is adjacent to two data sectors, for example. Similarly, "consecutive" refers to nominally successive items in a (circumferential or temporal) sequential sense. Regularly-spaced items in a sequence can be "consecutive" even if oddly-spaced, dissimilar items are inserted interstitially. A "stop" is a rigid element against which the actuator can be urged so as to prevent further actuator motion inward or outward. A "crash stop" is a stop that that is constructed and arranged to protect the actuator from damage in the event of an untimely loss of power or orientation.

Turning now to FIG. 1, there is shown a method 1500 comprising steps 1520 through 1550. For each of several heads supported on an actuator, at step 1530 the actuator is urged against a stop while identifying each of several tracks (i.e. measuring a generally lateral position) on the corresponding data surface. Each set of gathered data can then be used for any of several purposes 1540. For a disc drive, for example, an estimated Disc Centering Offset (DCO) between the tracks' center and their shared center of rotation can be generated. This is explained more fully below with reference to the sample data of FIG. 9. This information can be very important for once-around tracking errors, spinning errors, timing errors, and the like. Well-chosen track range values are also important, for efficient resource allocation.

Figure 2:
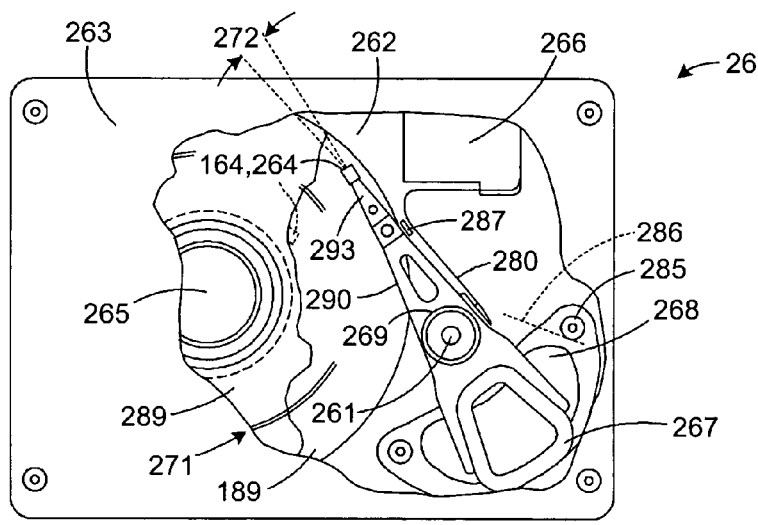
FIG. 2 shows a disc drive implementing the present invention.

Turning now to FIG. 2, there is shown a "top view" of a disc drive 260 configured to perform method 1500 of FIG. 1, or another method such as those of FIGS. 10 & 11. (Relational terms like "top view" are arbitrary here, in that data handling systems like drive 260 can generally operate in any orientation.) Drive 260 includes "top" cover 263 that cooperates with base 262 to form a sealed chamber. Components supported in the chamber include a spindle motor 265 which rotates a stack comprising one or more data storage discs 189,289 at hundreds or thousands of revolutions per minute. Information is written to and read from data surfaces on the disc(s) 189,289 through the use of an actuator assembly 261, which rotates during a seek operation about a bearing shaft assembly 269. Actuator assembly 261 includes one or more actuator arms 290 which extend above and below each of the disc(s) 189, 289, with one or more flexures 293 extending from each of the actuator arms. Mounted at the distal end of each of the flexures is a head 164,264 that can fly in close proximity adjacent the corresponding data surface of an associated disc 189,289.

Servo and user data travels through a selected one of the heads 164,264 and flex cable 280 to control circuitry on controller board 266. (Controller board 266 is configured to perform a method of the present invention shown in FIG. 1, FIG. 10 or FIG. 11.) Flex cable 280 maintains an electrical connection by flexing as each head 164,264 seeks along its path between tracks on disc(s) 189,289. During a seek operation, the overall track position of heads 164,264 is controlled through the use of a voice coil motor (VCM), which typically includes a coil 267 fixedly attached to actuator assembly 261, as well as one or more permanent magnets 268 which establish a magnetic field in which coil 267 is immersed.

The controlled application of current to coil 267 causes magnetic interaction between permanent magnets 268 and coil 267 so that coil 267 moves. As coil 267 moves, actuator assembly 261 pivots about bearing shaft assembly 269 and heads 164, 264 are caused to move across the surfaces of the disc(s) 189,289 between the inner diameter and outer diameter of the disc(s) 189,289. The outer diameter is bounded by a position at which one or more arms 290 of assembly 261 engage crash stop 287, which is rigidly affixed to base 262 so as to prevent heads 164,264 from sliding off their respective data surfaces. The inner diameter is similarly bounded by a position at which actuator assembly 261 engages crash stop 285 rigidly supported by base 262. Position 286 shows, with dashed lines, where actuator 261 will be when its heads 164,264 are at the inner diameter. Contiguous annular system track band 271 includes two guardbands (in black) bounding several system tracks (in white) written onto each data surface such that the head/track skew 272 is about 0°. Advantages of this configuration are discussed below, in reference to FIG. 11.

As mentioned previously, difficulties have arisen in the cost-effective manufacture of data handling systems like that of FIG. 2. Many of the difficulties relate to exceedingly high track pitch and precise timing requirements. For example, servo-writing many thousands of finely-pitched tracks takes a lot longer than servo-writing at lower densities. For this reason some skilled in the art are looking to PSP systems. Others are looking to systems for having the data handling system servo-write itself. Both of these techniques can introduce significant offsets between detections of marked positions not previously encountered.

Figure 3:
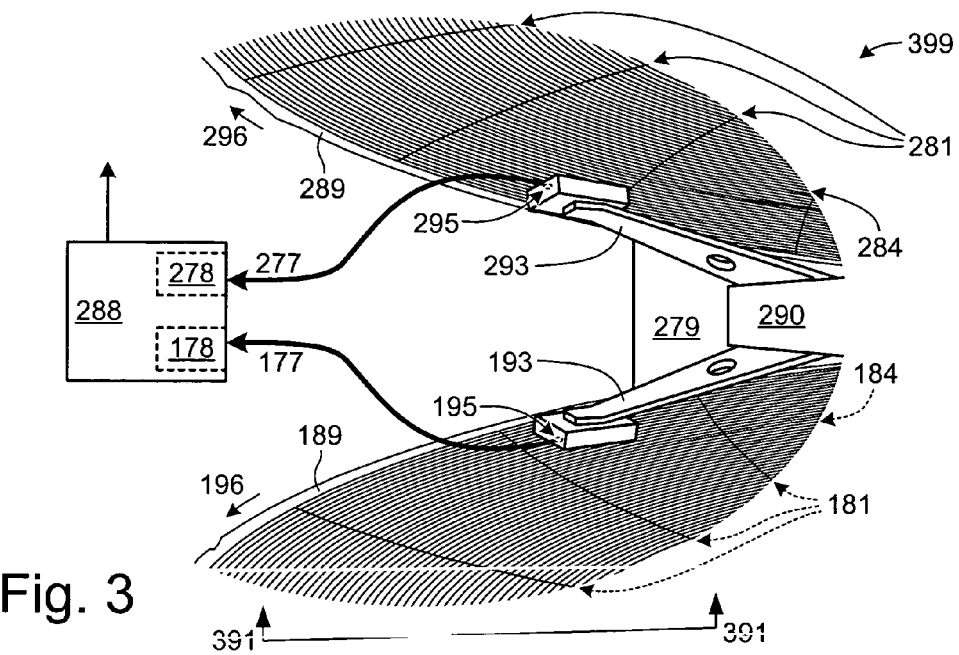
FIG. 3 shows a more magnified view of the disc drive of FIG. 2.

To illustrate this FIG. 3 shows a close-up "side view" 399 from between two of the discs 189,289 of disc drive 260 (not to scale). As FIG. 3 shows, rotary actuator arm 290 supports read/write transducers 195,295, respectively positioned to access outer tracks 184 of disc 189 and/or from outer tracks 284 of disc 289. In fact, actuator arm 290 is urged (biased) against crash stop 287 so that heads 164,264 are each at the outer diameters of the respective data surfaces. The pitch between tracks 184,284 is actually exceedingly fine, orders of magnitude denser than those shown. Read/write transducers 195,295 are supported by arm 290 via flexures 193,293.

Discs 189,289 rotate at a controlled speed about a common axis as shown by respective movement indicators 186,286. Transducer 195 leads transducer 295 slightly. Transducer 195 is also closer to the discs' axis of rotation than transducer 295. Transducer 195 generates an output 177 that is received into buffer 178 of processor 288, which is implemented in control circuitry on controller board 266 of FIG. 2. Transducer 295 similarly generates an output 277 that is received into buffer 278. (Transducers 195,295 transmit outputs 177,277 via a preamplifier circuit supported on the actuator, not shown.)

An important component of transducer outputs 177,277 is position information found in servo wedges 181,281 on respective surfaces. (In FIG. 3, note that servo wedges 181 will typically not be encountered by transducer 195 at the same time that servo wedges 281 are encountered by transducer 295.) Most or all of the position information that enables transducers 195,295 stay on their respective tracks is found in marks within the servo wedges. It should be understood that servo "wedges" are so named because they ordinarily taper narrower near the inner tracks of each surface, toward the discs' centers. Also, the wedges are typically not perfectly radial. They each curve in a generally circular arc so that an actuator rotation will not greatly alter the time at which a given servo wedge will be encountered by a corresponding transducer.

Figure 4:
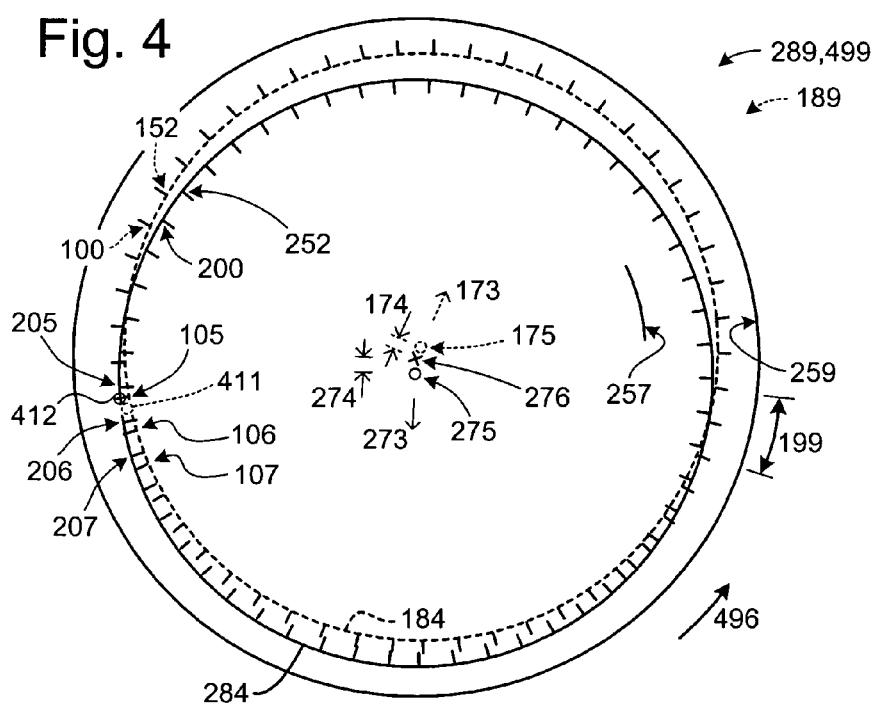
FIG. 4 shows yet another view of the disc drive of FIG. 2, one in which only selected elements are shown.

Turning now to FIG. 4, there is shown a "bottom view" 391 of selected items in FIG. 3, in the rotating frame of reference 499 of disc 289. The extent of permissible motion of each transducer is bounded by an outer diameter 259 and an inner diameter 257, corresponding roughly to track zero and the maximum track, respectively. Transducer 295 follows a nominally circular track 284 near the outer diameter 259, while transducer 195 zigzags along somewhere near offset circular track 184 of disc 189. The circle of track 284 has a center 275 that is offset from the discs' axis of rotation 276 by an offset 274 in a direction (phase) 273 as shown. Track 184 similarly has a center 175 that is offset from the discs' axis of rotation 276 by an offset 174 in a direction (phase) 173 as shown. Offsets 174,274 are shown atypically large for clarity. For pre-written discs installed into a data handling system, it is expected that each track-center offset will be at least one to three orders of magnitude greater than a nominal track pitch. Centering errors of a similar magnitude may arise in field operation, particularly in laptop computers that suffer lateral shocks.

Recalling that FIG. 4 is a view from the discs' frame of reference, it will be understood that transducers 195 & 295 seek or track follow radially as they rotate about the axis of rotation 276. At a selected moment of interest, transducer 195 is in position 411 and transducer 195 has just detected position 105 (traveling circumferentially in direction 496 as shown, relative to the discs). It is being de-selected, after which it will and further out as shown in FIG. 3. Transducer 295 has just encountered position 205 without detecting it, is being activated, and is about to encounter and detect positions 206 and 207. Circumferential positions 100 through 152 on disc 189 are all encountered by transducer 195 during its rotation. Circumferential positions 200 through 252 on disc 289 are all encountered by transducer 295 during its rotation. All of these positions 100-152 & 200-252 are servo wedges (or sectors) that include a servo wedge number (or sector number) that is at least zero and at most N−1, where N is each surface's nominal number of servo wedges. In modern hard disc drives there are typically hundreds of such wedges on each data surface (i.e. N>100). Finally, it should be noted that discs 189,289 of FIG. 4 have a significant angular misalignment 199 (i.e. greater than one microradian) as shown. In fact this is the effective worst case misalignment between any two corresponding servo sectors on the respective disc surfaces, taking circumferential offset 198 between the heads into account.

Figure 5:
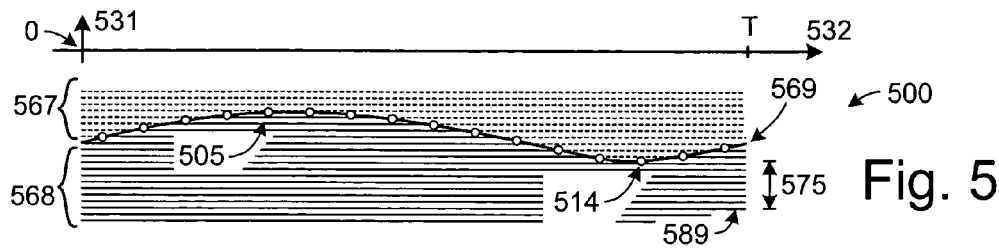
FIG. 5 shows a data surface of another device implementing the present invention, projected in a polar coordinate mapping so that nominally circular tracks are plotted horizontally.

FIG. 5 shows a disc surface 500 in a device implementing the present invention, projected as a plot of a head's radial position 531 versus its circumferential position 532. For present purposes it can be assumed that surface 500 rotates at constant velocity in a device similar to that of FIG. 2. For this reason axis 532 coincides with units of time between time zero (i.e. at axis 531) and time T, one disc revolution later. The scale of radial position 531 is greatly magnified for purposes of clarity, as shall soon be apparent. Also the plot is distorted so that servo fields within a wedge are vertically aligned.

Disc surface 500 rotates adjacent to a transducer (not shown) supported by an actuator that is urged against a crash stop that is generally like the stops 285,287 of FIG. 2. This causes the transducer to trace along path 569 repeatedly. The stop permits the transducer to access all of a data region 568 (of disc 500) containing many thousands of tracks, but none of region 567. For this reason, tracks and track portions in region 567 are shown in dashed lines. While following path 569 the head reads several track identifiers each revolution, including a lowest reading 505 and a highest reading 514.

The physical track identifier value at axis 532 is zero, and increases by one at each successive track (downward). These are called "physical" track identifiers because they are actually written into the tracks, in Gray Code. The Gray Code written at reading 505 is (track number) 479. The Gray Code written at reading 514 is 487. (The horizontal lines in FIG. 5 signify the center lines of the physical tracks.) All sixteen readings shown in FIG. 5 are given in the top row of a table in FIG. 9, as explained below.

To store and retrieve data on surface 500, it is better for a host to be able to use "logical" track identifiers than "physical" track identifiers. A simple scheme for doing so is to define a fixed difference between each "physical" identifier and its "logical" counterpart. With one such a scheme, track 589 becomes the logical track zero. Using this scheme, the usable tracks of surface 500 are numbered starting from zero. This provides a guardband 575 of about seven track-widths. For purposes of this example, it is assumed that a margin of about 4.8 track-widths are sufficient to ensure that no actuator of a given design will have frequent undesirable collisions with its crash stop. Guardband 575 is thus somewhat larger than necessary, the reason for which is explained below.

Figure 6:
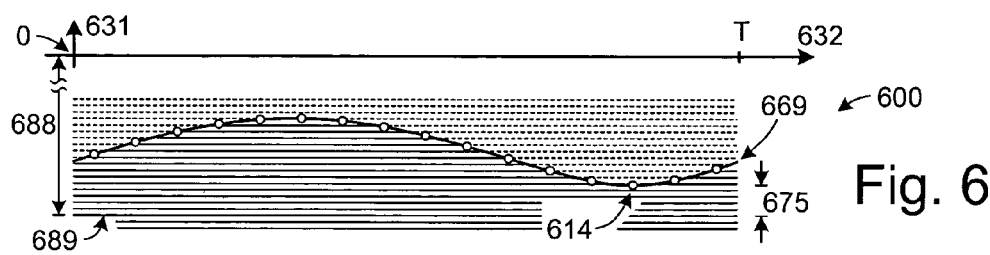
FIG. 6 shows another data surface of the device that includes the data surface of FIG. 5, projected in the same manner as FIG. 5 is.

FIG. 6 shows another disc surface 600 in the same manner, and on the same disc, as surface 500 of FIG. 5. The surfaces 500,600 are configured so that like-numbered physical tracks are very closely aligned (i.e. within about 1 to 3 track widths) so as to form a "cylinder." A head (not shown) follows path 669 as plotted in radial position 631 versus circumferential position 632, being mounted on the actuator that is urged into contact with the stop just mentioned. A "First Cylinder Offset" 688 is defined as the offset between physical track zero (i.e. axis 632) and logical track zero (i.e. track 689). Both logical track zeroes 589,689 include many written servo fields, each of which includes (among other things) a physical track identifier of 494. The worst case reading 614 is 489 in this case, so the FCO guardband 675 of surface 600 is only about five track widths. As explained above, this is more than sufficient to ensure that no actuator of a given design will have frequent undesirable collisions with its crash stop as it seeks to or accesses logical track zero 689, despite typical manufacturing variances. Recalling that surface 500 used an unnecessarily large guardband 575, it is now apparent that the reason for this is to provide an FCO of 494 that is common to both surfaces 500,600, while providing a sufficient guardband 675 for the worst-case surface 600 of its disc. Having an FCO that is common to more than one surface in a disc stack is not always advantageous, though, and it is generally preferable to have outer crash stop guardbands within a stack (like 575&675) be uniform to within at most 1-2 track widths.

Figure 7:
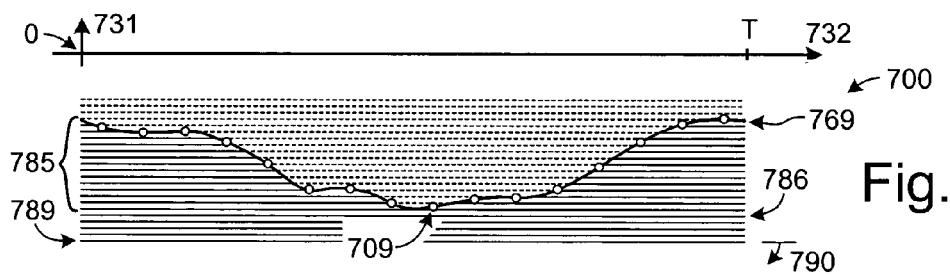
FIG. 7 shows yet another data surface of the device that includes the data surface of FIG. 5, projected in the same manner as FIG. 5 is.

Referring now to FIG. 7, there is shown another disc surface 700 of the same co-rotational stack as surfaces 500&600 Surface 700 is similarly plotted as a radial position 731 versus a circumferential position 732. Path 769 is generated with the same actuator urged against the same crash stop as mentioned above relative to FIGS. 5 & 6. Path 769 has a notably different shape, however, because its center is offset in a different direction and because its shape includes several local distortions that have resulted from temperature changes and similar mechanical stresses. These are manifested as variations from an ideal sinusoidal form. FIG. 7 includes a suitably-selected logical track zero 789 (at physical track 462) that is offset by more than 4.7 track-widths from a worst-case reading 709. This saves 32 tracks on data surface 700, as compared with using FCO=494 as derived for surfaces 500&600.

In a typical embodiment of the present invention, several partially-accessible annular tracks (such as 785) will be sensed while urging an actuator laterally against a stop, and a track range (such as 790) will be determined for the data surface so as to exclude them. Typically one or more fully-accessible annular tracks (such as 786) will also be excluded by this determination.

Figure 8:
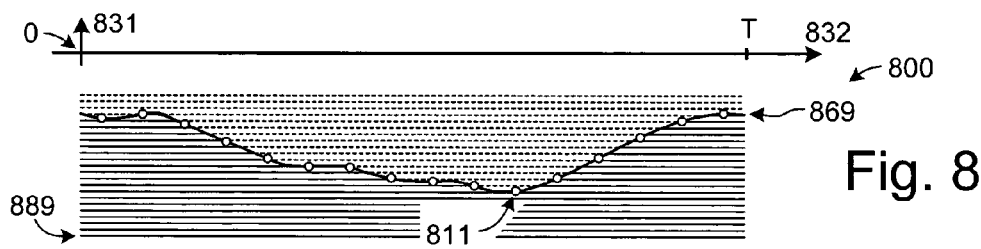
FIG. 8 shows still another data surface of the device that includes the data surface of FIG. 5, projected in the same manner as FIG. 5 is.

FIG. 8 shows the opposite surface 800 of the disc 700 of FIG. 7. The surfaces 700,800 are configured so that like-numbered physical tracks are very closely aligned (i.e. within about 1 to 3 track widths) so as to form a "cylinder." Some might consider the physical track zeroes of all four surfaces to form a "cylinder," but the misalignment between discs is one or more orders of magnitude larger than one nominal track width in this present case. Like the other major disc surfaces, surface 800 is plotted as a radial position 831 versus a circumferential position 832. Path 869 is generated with the same actuator urged against the same crash stop, having a shape that is somewhat similar to path 769. A worst-case reading 811 (at physical track 455) confirms that FCO=462 provides a larger margin than exists on surface 700.

Figure 9:
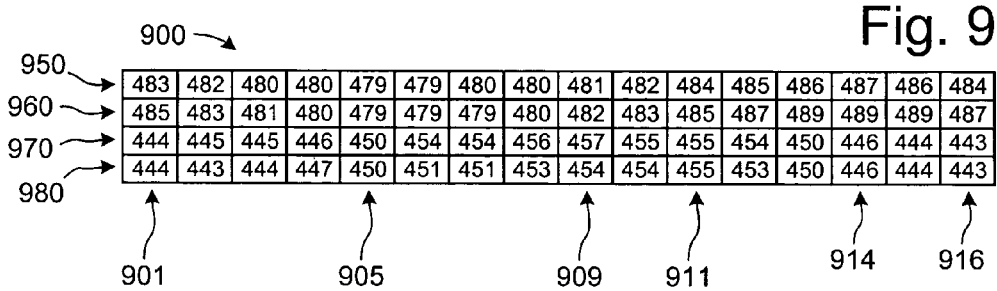
FIG. 9 shows a table containing 16 track identifiers read from each of the data surfaces of FIGS. 5-8.

Turning now to FIG. 9, there is shown a table 900 containing 16 track identifiers read from each of the data surfaces 500,600,700,800 of FIGS. 5-8. Each of the 16 radial positions is expressed as an integer, but each cell could also include a fractional track number obtained by monitoring servo bursts. This concise and simple example, using only 3-digit integers, was selected for illustration. Skilled practitioners will recognize that 5- to 7-digit integers would be appropriate for recording track numbers of the maximum accessible tracks. Note that FIGS. 5-8 would make a suitable example of such an implementation. So would FIG. 9, if each number in table 900 were replaced by Q-R, where Q is a large integer and R is the number being replaced. Also larger sample sizes than 16 per revolution will be more appropriate for a typical implementation.

Each of the columns 901 through 916 contains a respective one of the readings. Reading left to right, row 950 can be seen to coincide with the generally sinusoidal shape of FIG. 5. It starts at a medium reading (i.e. track identifier 483), goes to a minimum reading 505 of 479 (in column 905) and then to a maximum reading 514 of 487 (in column 914). Coinciding with FIG. 6, row 960 indicates a worst-case reading of 489 in column 914. Coinciding with FIG. 7, row 970 indicates a worst-case reading of 457 in column 909. Coinciding with FIG. 8, row 980 indicates a worst-case reading of 455 in column 911. If fewer than 16 samples per path are available, note that it may be better to use a best-fit sinusoid with period T to find the (worst case) highest track number, rather than a mere process of selected a highest-valued sample.

Referring again to FIG. 1, recall that a Disk Center Offset (DCO), between the tracks' center and their shared center of rotation, can be a figure of interest. DCO can be estimated as $(\frac{1}{2})*\text{mean}(\text{range}(P(j, i) \text{ for } i=1,2, \ldots, S)$ for one or more j), where j is an iteration index, i is a servo wedge index, and range(X) is the difference between the maximum and minimum values in vector X. Suppose j takes only two values, one corresponding to row 950 and the other corresponding to row 960. From row 950 of FIG. 9, in this case, range(X)=8 track widths. From row 960, range(X)=10 track widths. Thus for this disc, DCO is estimated as 4.5 nominal track widths. For implementations using variable track widths, a similar estimate can be derived the same way, preferably using high-precision radial position measurements.

FIG. 10 shows a flowchart of another method 1000 of the present invention, comprising steps 1005 through 1075. Several discs are servowritten so that opposite surfaces of the each disc have closely-aligned tracks in each physical cylinder 1010. After removing the discs, one or more of them are mounted onto a rotatable disc stack accessible by a rotary actuator 1020. The actuator is then biased against a crash stop 1025 at one of the limits of the actuator's lateral range of motion. Each of several lateral positions P(j, i) is measured at least once 1040 at the selected crash stop, where j is an iteration index and i is a servo wedge index. From these values each end-most fully accessible track position is located 1045. For a stop corresponding to higher-numbered tracks, this position is H(j)=min(P(j, i) for i=1,2, . . . , S). For a stop corresponding to lower-numbered tracks, this position is L(j)=max(P(j, i) for i=1,2, . . . , S).

Using this latter value, First Cylinder Offsets (FCO's) are derived for each set of data surfaces as a median or maximum L for that set of j's, plus a suitably selected design margin 1055. The margin can be used similarly in determining a MaxTrk value from a given set of H(j)'s, computed from values read at the opposite crash stop. (Note that a smaller margin may be used if the maximum L and minimum H are used, rather than the medians.) Later, a read or write command is received from a host, containing user-identified (logical) track or cylinder numbers 1060. At step 1065, servo code executes the command using a simple translation of PhyTrk=LogTrk+FCO, where PhyTrk=Physical/actual track to be accessed and LogTrk=Logical/user-defined track.

FIG. 11 shows a flowchart of another method 1100 of the present invention, comprising steps 1105 through 1185. PSP discs (those with a Prewritten Servo Pattern, written ex situ) are configured so that system tracks on each surface are written with a head/track skew<0.5° and with a microjog offset set based on head calibration values 1110. A system track band is designed with a total width of W nominal track widths 1115, the band including the system tracks and at least one track width on each side. A user read or write command is received from the host 1125, and its logical track is translated into a physical track 1130.

If the command calls for a READ operation 1140, SeekOffset is set to MROffset 1145. Otherwise, for a WRITE operation, SeekOffset is set to zero 1150. Recall that step 1115 defined a system track band W tracks wide. At step 1160, a determination is made whether the physical track number sought is below the band. If so, SeekBand is set to PhyTrk+SeekOffset 1165. If not, SeekBand is set to PhyTrk+SeekOffset+W 1170. Servo code causes the controller (such as 266 of FIG. 2) to seek to the location defined by SeekBand to perform the specified operation. Advantageously, method 1100 makes the PSP system tracks transparent to the normal R/W code when accessing user tracks.

In a preferred embodiment consistent with FIG. 2, system track reads are performed while the read transducer is nominally positioned on the servo track center. In this position, for example, data can be uploaded upon a first powerup after disc stack installation. Later system track writes in situ are performed while the read transducer is nominally positioned on the reverse MR offset position, so that the writer is on the servo track center. In this position, for example, data from pretest/certification can be written onto the disc surface.

It is to be understood that even though numerous characteristics and advantages of various embodiments of the invention have been set forth in the foregoing description, together with details of the structure and function of various embodiments of the invention, this disclosure is illustrative only. Changes may be made in detail, especially in matters of structure and arrangement of parts within the principles of the present invention to the full extent indicated by the broad general meaning of the terms in which the appended claims are expressed. For example, the particular elements may vary depending on the particular position monitoring application while maintaining substantially the same functionality. Although the more detailed embodiments described above relate to data handling devices, other applications involving the interpretation of cyclic bit sequences can readily benefit from these teachings without departing from the scope and spirit of the present invention.

Moreover, it will be appreciated by those skilled in the art that the selection of a suitable cylinder definition scheme involves several trade-offs. The best solution will depend on the application, and except as specified below, no particular solution to this trade-off is of critical importance to the present invention. Moreover a selection of designs will typically be available and readily derived, depending on the robustness and other performance characteristics required. One of ordinary skill will be able to use the above description to design and implement a variety of methods and devices using suitable stop configurations in light of the teachings above, without undue experimentation.

What is claimed is:

1. A method comprising steps of:
   (a) positioning a data surface adjacent a head mounted onto an actuator;

(b) while urging the actuator into a stationary lateral position against a stop, sensing a plurality of partly accessible tracks on the surface; and (c) defining an accessible track range for the surface that includes fully accessible tracks on the surface and excludes the sensed plurality of partly accessible tracks.

2. The method of claim 1 in which the positioning step (a) includes steps of:

(a1) simultaneously writing a co-rotatable stack of several discs in a multi-disc writer; and (a2) removing a selected one of the several discs from the co-rotating stack, the selected disc including the data surface.

3. The method of claim 1 in which the positioning step (a) includes a step (a1) of mounting a disc that includes the data surface onto a spindle assembly, the data surface containing a prewritten servo pattern (PSP).

4. The method of claim 1 in which the positioning step (a) includes a step (a1) of positioning the actuator and the head relative to the data surface so that system tracks on the surface are written with a head/track skew of about 0°.

5. The method of claim 1 in which the urging step (b) includes a step (b1) of reading from end-most numbered track that the stop permits the head to fully access.

6. The method of claim 5 in which the defining step (c) further includes a step of designating a guardband that includes the end-most numbered track that the stop permits the head to access, the guardband being adjacent to one side of the track range for the surface such that the defined accessible track range excludes the end-most fully accessible track.

7. The method of claim 1 in which the defining step (c) includes a step of designating a track range limit that is based on the plurality of partly accessible tracks and on a predetermined design margin wider than one track, the margin derived from a known mechanical tolerance.

8. The method of claim 1, further comprising a step (d) of deriving another surface's track range partly based on the plurality of partly accessible tracks sensed in the urging step (b).

9. The method of claim 1 in which the urging step (b) includes a step (b1) of biasing an arm of the actuator against the stop.

10. A method comprising:

(a) of urging an actuator against a stop while identifying each of several tracks at a common, stationary lateral actuator position using a head supported by the actuator; and (b) defining an accessible track range for the surface partly based on a laterally-most extreme track that is identified and fully accessible during step (a).

11. The method of claim 10 in which the urging step (a) includes a step (a1) of reading from a highest-numbered track that the stop permits the head to access fully.

12. The method of claim 10, further comprising a step (c) of using the track identifications from the urging step (a) to estimate an offset between a center of the several tracks and a center of rotation of the several tracks.

13. The method of claim 10 in which the positioning step (a) includes a step (a1) of mounting a disc that onto a spindle assembly, the disc containing a prewritten servo pattern (PSP) including the several tracks.

14. The method of claim 10 in which the positioning step (a) includes steps of:

(a1) rigidly supporting the stop with a base; and (a2) rotatably mounting the actuator and a disc containing the tracks onto the base.

15. The method of claim 10, further including a prior step of designating a system track band that includes a block of several annular system tracks and at least one guardband track on each side of the block.

16. The method of claim 10, further including a prior step of designating a system track band that includes a block of several annular system tracks at a position where a head/track skew is about 0°.

17. A method comprising steps of:

(a) positioning a data surface adjacent a head mounted onto an actuator;

(b) sensing several lateral track identifiers while urging the actuator laterally against a stop at a fixed, common actuator position; and (c) determining an accessible track range for the surface partly based on the several lateral track identifiers.

\* \* \* \* \*